June 17, 1924.
S. M. SANDLIN
1,498,483
CHASSIS BRACE FOR AUTOMOBILES
Filed Sept. 22, 1923    2 Sheets-Sheet 2
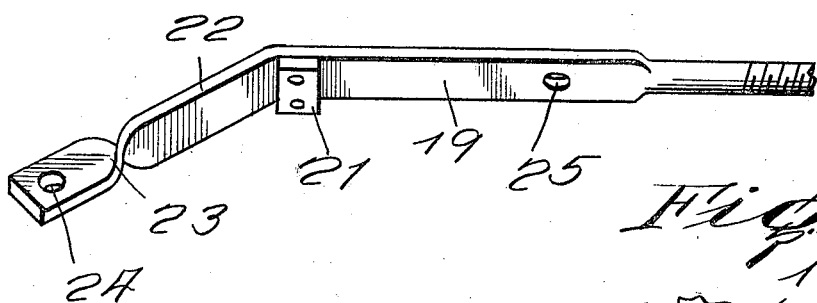
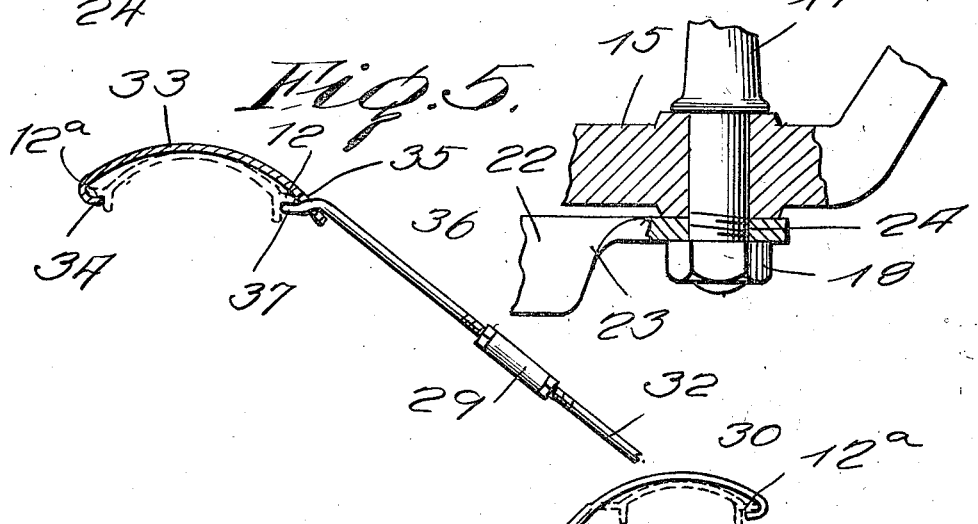
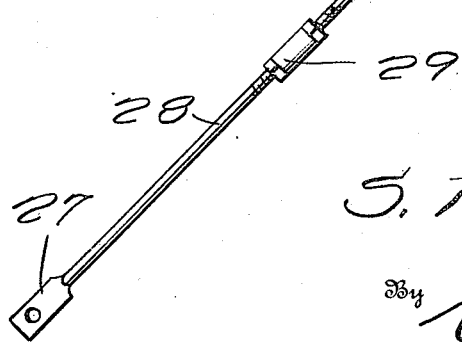

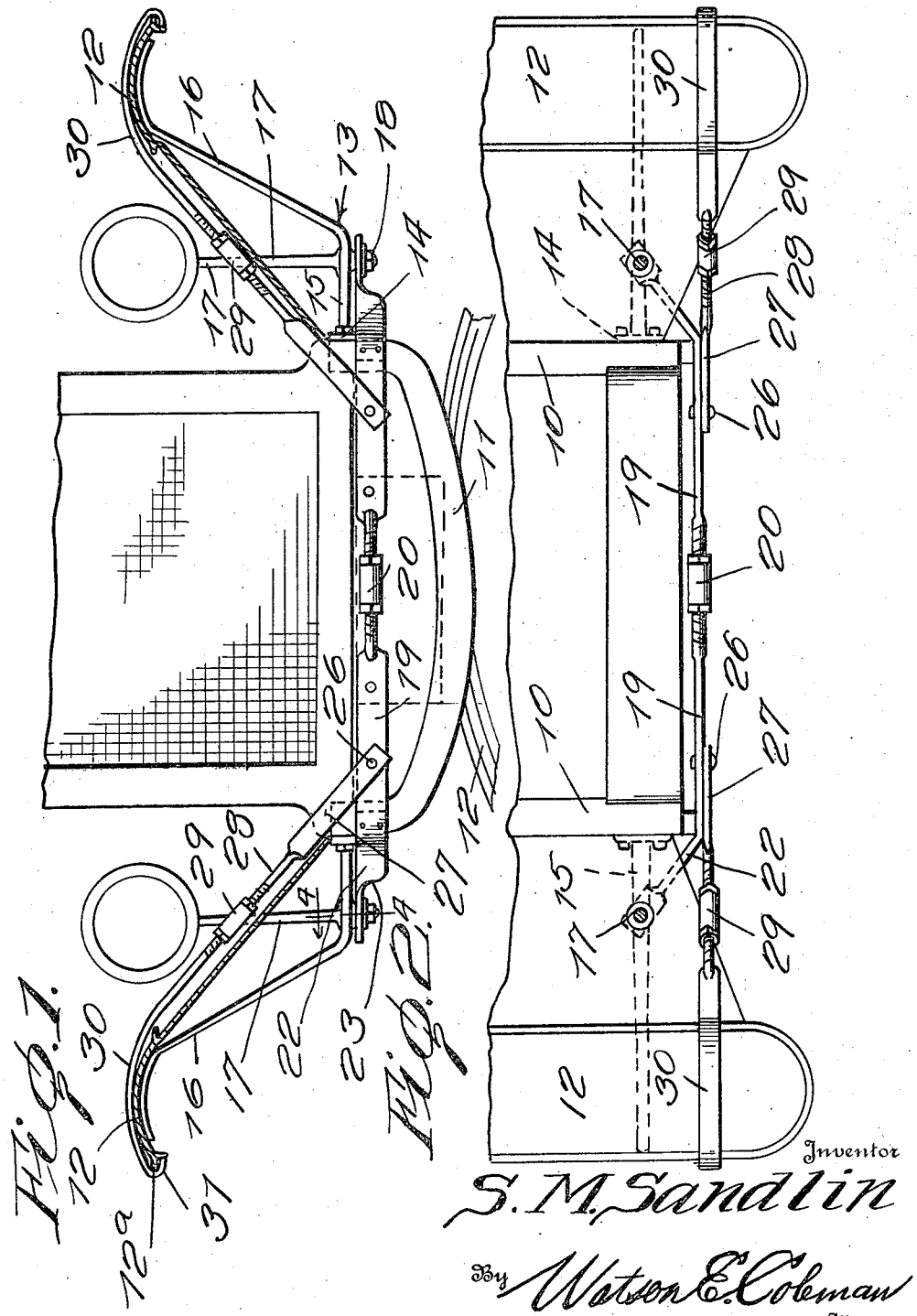

Patented June 17, 1924.

1,498,483

UNITED STATES PATENT OFFICE.

SID M. SANDLIN, OF WINNSBORO, TEXAS, ASSIGNOR OF ONE-HALF TO JAMES T. ZIMMERMAN, OF WINNSBORO, TEXAS.

CHASSIS BRACE FOR AUTOMOBILES.

Application filed September 22, 1923. Serial No. 664,190.

*To all whom it may concern:*

Be it known that I, SID M. SANDLIN, a citizen of the United States, residing at Winnsboro, in the county of Wood and State of Texas, have invented certain new and useful Improvements in Chassis Braces for Automobiles, of which the following is a specification, reference being had to the accompanying drawings.

This invention relates to chassis braces for automobiles and has for an important object thereof the provision of a device which while primarily maintained to brace the front end of the frame of an automobile affords a convenient mounting for fender braces or the like.

An important object of the invention is to provide a device of this character which is so constructed that it does not in any manner interfere with the passage of air through the radiator.

A further object of the invention is to provide a device of this character which is readily applicable without in any manner altering the present construction of the vehicle and which will be durable and efficient in service.

These and other objects I attain by the construction shown in the accompanying drawings, wherein for the purpose of illustration is shown a preferred embodiment of my invention and wherein:—

Figure 1 is a fragmentary front elevation of the chassis of the vehicle showing a brace constructed in accordance with my invention applied thereto;

Figure 2 is a fragmentary plan view of the front end of the chassis of the vehicle to which the brace has been applied;

Figure 3 is a perspective view of one end of the main brace;

Figure 4 is a detail sectional view showing the manner of attaching the ends of the main brace to the lamp brackets; and Figures 5 and 6 are views showing forms of fender braces which may be employed with the main brace.

Referring now more particularly to the drawings, the numeral 10 indicates spaced side members of an automobile body frame. In the chassis of one well-known type of vehicle these side frame members are spaced and connected by a front end member 11 in the form of a shallow U, the ends of the arms being connected to the front ends of the side members. With the central portion of this front end brace the supporting spring 12 of the chassis is engaged. Accordingly the central portion of this front end member 11 supports the entire weight of the front end of the vehicle with the result that the front end member has a tendency to flatten so that the arms of the U spread thereby widening the front end of the frame, loosening connections and causing unpleasant rattling noises which usually accompany this form of construction. In this form of construction the wheel fenders 12 are usually supported by brackets 13 secured at one end to the side members of the frame, as indicated at 14, and have a horizontal portion 15 terminating at an upwardly and outwardly inclining arm 16, the upper end of which is secured to the undersurface of the fenders. This arm in addition to bracing the fenders forms a support for the headlight mountings 17 which extend through the arm and are secured in position by means of a nut 18 threaded upon the lower end thereof.

In accordance with my invention I provide a bar extending transversely of the front end of the frame and composed of two sections 19 having their adjacent end portions oppositely threaded for engagement with a turn buckle 20. The ends of these arms are provided with bumpers 21 upon their rear faces which engage against the front end of the frame structure to maintain the bar in spaced relation to such front end and so that the turn buckle may be conveniently manipulated. These end portions are provided with rearwardly inclining extensions 22, the ends of which are given a quarter bend, as indicated at 23, and provided with an opening 24 adapted to receive the lower end of the lamp support 17. In practice the lamp support 17 has a nut 18 thereof removed therefrom the section 19 applied thereto by inserting the end of the lamp support in the bracket and the nut replaced. Since the fender braces 13 are rigid to the frame and the ends of the sections 19 are secured to such fender braces, it follows that upon manipulation of the turn buckle the side frame sections 10 will be drawn toward one another and the end frame section 11 will be forced inwardly against the ends of the side frame sections, thus tightening the frame in two directions in addition to rigidifying the entire front end of the vehicle as well as the fender braces 16.

Each section 19 is preferably provided with an opening 25 for the reception of a securing element 26 which is directed through the flattened end portion 27 of a fender brace 28. These fender braces in general consist of an arm including a turn buckle 29 by means of which the length thereof may be adjusted and a flattened free end 30 adapted to engage over the fender 12 with which it is associated and having at its extremity a hook 31 receiving the outer flange 12ª of the fender. The construction of the arms is capable of a considerable variation. In Figures 1 and 2 I have illustrated a flat bar formed in two sections, the adjacent ends of the sections being rounded and threaded for the reception of the turn buckle. In Figure 6 I have shown a fender brace consisting of rounded sections, the end of one section being flattened for engagement with the bar section 19. In Figure 5 I have disclosed the arm as composed of three sections, one section 32 being adapted for engagement with the arm section 19, a flat metal strip 33 having a hook 34 for engaging over the outer fender flange 12ª and having an opening 35 in its inner end and a connecting section for the sections 32 and 33 consisting of a round bar 36 having one end portion thereof offset, as indicated at 37, and the opposite end screw-threaded for engagement with a turn buckle 29 by means of which it is connected to the section 32. This offset end portion 37 of the section 36 is extended through the opening 35 of the section 33 and has its terminal portion engaged beneath the inner flange 12ᵇ of the fender. It will be seen that upon tightening the turn buckle 29 the offset end portion 37 will be forced very firmly into engagement with this inner flange and the hook 34 will be drawn very firmly into engagement with the outer flange with the result that the fender will be very rigidly held.

From the foregoing it will be seen that I have provided a device by means of which the front end of the frame may be restricted and rigidified to eliminate looseness in the connections thereof and have likewise provided a device which affords a novel means of mounting a fender brace for supporting the fenders 12. It will be obvious that the constructions both of the front end brace and the fender braces associated therewith may be modified to a considerable extent and I accordingly do not limit myself to such specific structure as hereinbefore set forth except as hereinafter claimed.

I claim:—

1. The combination with a vehicle embodying wheel fenders and a front end cross member, of a brace for said front end cross member including means for drawing the ends of the fenders and cross member toward one another, said brace having attached thereto adjacent each end thereof a member having a hooked free end adapted to engage the outer flange of the corresponding fender, said member being adjustable as to length and comprising a pair of sections, one bearing said hook and overlying the fender, the inner end of said section being provided with an opening, the other of the sections having an offset end portion adapted to extend through said opening and engage the inner flange of the fender.

2. The combination with a vehicle embodying wheel fenders and a front end cross member, of a brace for said front end cross member including means for drawing the ends of the fenders and cross member toward one another, said brace having attached thereto adjacent each end thereof a member having a hooked free end adapted to engage the outer flange of the corresponding fender, said member being adjustable as to length and comprising a pair of sections, one bearing said hook and overlying the fender, the inner end of said section being provided with an opening, the other of the sections having an offset end portion adapted to extend through said opening and engage the inner flange of the fender, means for adjusting the length of said fender brace being included in the last named section.

In testimony whereof I hereunto affix my signature.

SID M. SANDLIN.